United States Patent [19]

Lutz

[11] 4,294,301

[45] Oct. 13, 1981

[54] VALVE CONSTRUCTION FOR TUBELESS TIRE

[75] Inventor: Sepp Lutz, Giengen, Fed. Rep. of Germany

[73] Assignee: Alligator Ventilfabrik GmbH, Fed. Rep. of Germany

[21] Appl. No.: 109,073

[22] Filed: Jan. 2, 1980

Related U.S. Application Data

[63] Continuation of Ser. No. 819,991, Jul. 28, 1977, abandoned.

[30] Foreign Application Priority Data

Jul. 29, 1976 [DE] Fed. Rep. of Germany ....... 2634153

[51] Int. Cl.³ ............................................. B60C 29/00
[52] U.S. Cl. ................................... 152/427; 137/223; 152/DIG. 11; 251/145
[58] Field of Search ............... 152/427, DIG. 11, 428; 137/223, 231; 251/145; 285/203, 204, 211, 222

[56] References Cited

U.S. PATENT DOCUMENTS

| | | | |
|---|---|---|---|
| 2,813,568 | 11/1957 | Kilmark, Jr. ............... | 152/DIG. 11 |
| 2,836,217 | 5/1958 | Boyer ................................... | 152/427 |
| 3,754,731 | 8/1973 | Mackal et al. ....................... | 137/223 |

Primary Examiner—William A. Powell
Assistant Examiner—Thomas Bokan

Attorney, Agent, or Firm—McGlew and Tuttle

[57] ABSTRACT

A valve for a tubeless tire which is adapted to be secured in a bore of a tire rim comprises a tubular valve body with an outer rim surface engagement flange formed on its periphery and spaced from an inner rim surface engagement flange by the length of the bore through the tire rim. At least one of the outer or inner rim surface engagement flanges is deformed into engagement with the associated tire rim surface. Preferably, a sleeve of a soft material is located around the body between these flanges and it is deformed and compressed into a groove formed by the respective flanges over each end surface of the tire rim. The construction is such that when the valve body is inserted from the exterior of the rim to the interior, the inner flange is formed by bending over the end of an internally formed sleeve which encompasses the end of a soft body or gasket and bends it into engagement with the associated inner surface of the tire rim. When the body is inserted from the interior of the rim outwardly, the flange on the exterior surface is formed by bending over a tubular end of the deformable flange on the valve body. The deformable flange may also be formed by expanding the interior bore of the tire valve body to form an annular bead which engages over the soft body forming a gasket.

5 Claims, 6 Drawing Figures

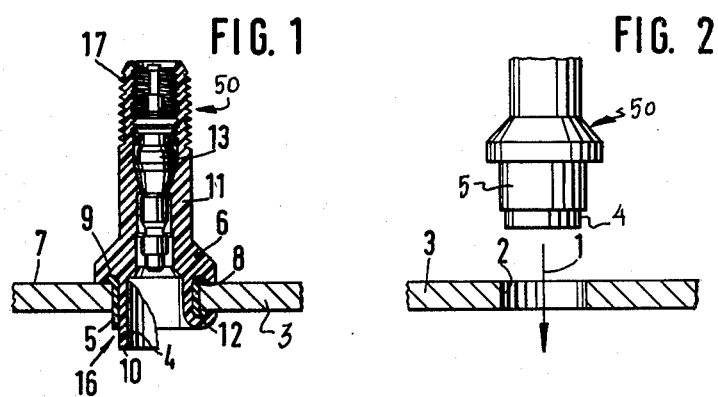
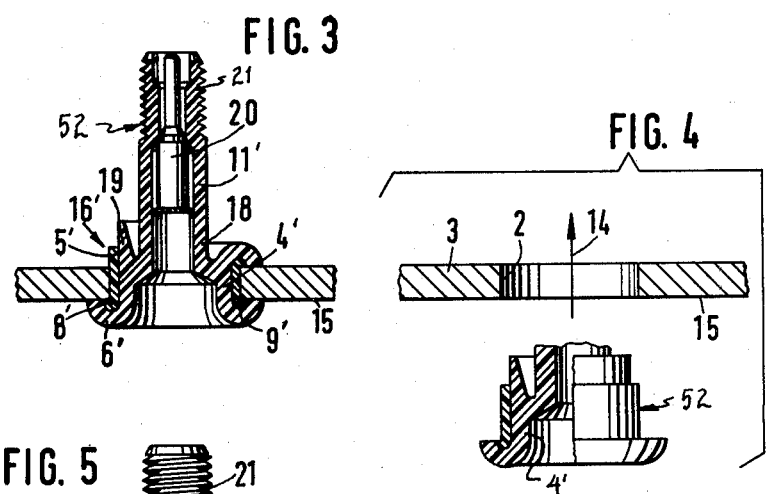
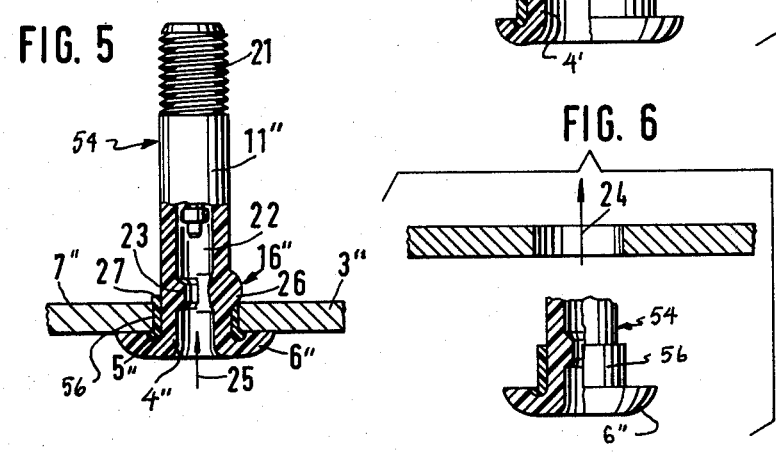

4,294,301

VALVE CONSTRUCTION FOR TUBELESS TIRE

This is a continuation of application Ser. No. 819,991, filed July 28, 1977, now abandoned.

FIELD AND BACKGROUND OF THE INVENTION

This invention relates in general to the construction of tire valves and, in particular, to a new and useful valve for a tubeless tire, to be secured in a bore, punched aperture, or the like, of a wheel rim, including a tubular valve body and an outer flange provided thereon.

DESCRIPTION OF THE PRIOR ART

It is usual to fix tire valves to the wheel rim in a manner such that they are passed through the bore in the rim and secured by means of a nut while interposing packing and supporting washers. Since threaded portions and packing and fixing elements are used for securing, such a valve is expensive not only in manufacture but also in mounting. In addition, the mounting operation is very time-consuming. Excessive tightening of the securing nut frequently damages or even destroys the rubber packings.

Further damages on the valve or the location to be sealed, may also occur. In any case, upon damaging a packing or packings, at least an undesirable escape of air must be taken into account. Another disadvantage is that the rubber packings age and consequently get brittle and crack. This again affects the sealing and a considerable risk for the driver and the vehicle may be the result. For this reason, tire manufacturers recommend the exchange of the valve along with any renewal of a tire.

So-called rubber valves for buttoning into the valve hole of the wheel rim for tubeless tires are also known. These valves ordinarily comprise a metal body which receives the valve core, and the rubber case is vulcanized thereon. The mounting of such a valve is relatively simple, but the manufacture, particularly the vulcanization, is very expensive. In addition, this construction requires continuous checking for quality, particularly checking of the tightness of the metal-rubber contact. Up to the present time, no economically satisfactory checking method has been found for testing these tire valves, which are mass-produced. For this reason, manufacturers of these valves are forced to make destructive tests on selected samples and then draw an inference as to the quality of the non-tested valves from these tested samples. Considering that the tire valve is one of the elements on which the security of the vehicle depends, this method of checking is certainly unsatisfactory. In addition, at high speed, these rubber valves tend to an inclined position under the centrifugal force, which may result in leakage.

SUMMARY OF THE INVENTION

The present invention is directed to a valve for a tubeless tire which is simple to manufacture and, therefore, inexpensive, which can be mounted without problems and secured in a manner such that a tightness between the rim and the valve is ensured which meets high-test requirements.

To this end, a valve is provided in which, in accordance with the invention, the valve body comprises a deformable fixing rim, collar, or the like, which is spaced from the outer flange of the body by a distance corresponding approximately to the length or axial extension of the wheel-rim bore or aperture. This valve is introduced into the wheel-rim bore, punched aperture, or the like, until its outer flange abuts on the wheel rim. Thereupon, the fixing rim, projecting beyond the other surface of the wheel rim is bent or pressed sidewards, whereby, the wheel rim becomes clamped between the outer flange and the fixing rim of the valve body in the area of the wheel-rim bore. This manner of fixing may be compared to riveting, upsetting, or beading. The portion of the valve body extending between the flange and the fixing rim must, of course, be conformable, at least approximately, to the cross-sectional area of the wheel-rim bore and pass therethrough without substantial play.

The term "wheel-rim bore" used herein is not intended as limitative. As a rule, the wheel-rim bore is circular or cylindrical and, consequently, the portion between the flange and the fixing rim of the valve body or shank is also tubular. If the valve body is made of plastic, particularly, of a plastic with cold flow properties, the provided manner of fixing results in an absolutely tight connection with the wheel rim, without the need for any sealing elements. At the same time, a very stable seat of the valve is obtained and, even at very high travel speeds, the valve does not change its position. A particular advantage of the invention is that this valve also makes it possible to simplify the manufacture of the wheel rim. That is, the base of the rim can be made substantially flatter since some smaller valve holes than heretofore are suitable for fixing the valve. Due to this flattening of the drop base, the size of the vehicle brakes can be correspondingly enlarged. This also increases the security of the vehicle.

According to a particularly preferred embodiment of the invention, a portion adjacent or close to the outer flange of the shank of the valve body is surrounded by a soft lining or layer which is preferably thin-walled, and of a length corresponding to, or slightly exceeding, that of the wheel-rim bore, and the outer diameter is substantially equal to the diameter of the wheel-rim bore. Again, in this variation, a minimum play between the wheel-rim bore and the outer diameter of the soft lining is provided, which is only sufficient to permit the easy introduction of the valve into the bore. By bending the deformable fixing rim, the soft lining is also deformed and, in particular, it may be bent at the location associated with the fixing rim. In addition, it may be upset in the zone of the wheel-rim bore. Because of this deformation and compression of the soft lining, the gap between the valve body and the wheel-rim is filled out absolutely airtight. In this connection, it is irrelevant whether the wheel-rim hole has been drilled, punched, or made otherwise, because with an appropriate selection of the material and dimensioning, the soft lining penetrates into all irregularities of the wheel-rim bore and valve shank surfaces, thereby ensuring an absolutely tight and firm seat of the valve in the wheel-rim.

The shape of the valve body may be most simple and may be designed for receiving any of the conventional, and also any new valve cores. The valve body can be fixed to the wheel-rim with the aid of a relatively simple tool.

In accordance with a development of the invention, the fixing rim or collar projects beyond the soft lining in the longitudinal direction of the valve body or it is located in the zone of the lining end which is remote from the outer flange. Consequently, the fixing rim or collar, or any adjacent portion of the valve body, can lay to the associated end of the soft lining and press it firmly against the border of the wheel-rim bore. The soft lining may be embraced completely in this area, so that it is both protected and particularly intensely compressed, which is very desirable in view of the sealing. This is particularly advantageous if the soft lining is made of a material with cold flow properties. The question whether to provide the center of the fixing rim at the same level as the respective end of the soft lining or somewhat higher or lower, depends on the shape of the fixing rim, its location on the shank, and on the manner in which the valve is fixed to the wheel rim.

The valve body is preferably made of a one piece construction with the outer flange and the fixing rim or collar, and, in particular, it is made of a rust-proof material. The materials to be considered may be, as already mentioned, a plastic or, for example, brass. As explained above, the diameter of the valve body and of the outer flange may be relatively small. This, of course, applies also to the length of the valve body with the manufacture in one piece. This results in a particularly small consumption of material and in a further reduction of costs. The valve body can be manufactured in a largely non-cutting operation.

According to another embodiment of the invention, the fixing rim or collar is formed by an extension of the shank portion surrounded by the soft lining, and its outer diameter preferably corresponds to the inner diameter of the soft lining. In other words, a tubular portion of the valve body is surrounded by the soft lining along a smaller length. In this design, the fixing rim or collar may be advantageously formed by the end to be secured to the wheel-rim of the valve body and the outer flange is then associated with the inside end of the soft lining.

In another variation of the invention, the fixing rim or collar is formed by a sleeve concentrically surrounding the valve body and the outer flange is provided on the inside end of the valve body, i.e., on the end remote from the valve inlet. In this case, the fixing rim or collar rests against the wheel-rim surface remote from the tire, while in the preceding embodiment, it rested against the surface facing the tire. Preferably, in this second variant again, the outer diameter of the fixing rim or collar corresponds, at least approximately, to that of the shank portion surrounded by the soft lining.

Another embodiment of the invention provides that the fixing collar is formed by an inner shoulder projecting into the bore of the valve body, or by the respective portion of the valve body in this zone. While fixing the valve body to the wheel rim, this inner shoulder is pressed outwardly by means of a suitable mandrel or a similar tool. This makes the valve body bulge at this location, whereby an outer collar is formed which applies against the associated surface of the wheel-rim and either simply engages over the soft lining or also presses it against this surface. The inner shoulder may have a semicircular cross-section, for example.

The outer flange is advantageously provided on the inside end of the valve body and the inner shoulder is spaced therefrom by a distance corresponding approximately to the thickness of the wheel-rim and, preferably, formed thereon. Another advantageous development of the invention is that the contact surface of the outer flange is provided with a groove which is adjacent to the shank of the valve body and open in the axial direction. It is useful to have this groove at least partly filled out by an outer collar of the soft lining. This portion of the lining may then serve as a well-known gasket. This is true particularly if the soft lining projects somewhat outwardly, beyond the groove.

The soft lining advantageously comprises a self-adhering or glued-on tubular part, or a layer deposited by spraying or sintering or fixed in a similar manner. It is advisable in particular to make the soft lining of rubber or plastic, preferably of polytetrafluoroethylene which is also known under the trademark "TEFLON" and whch has excellent cold flow properties.

Accordingly, it is an object of the invention to provide a valve for a tubeless tire to be secured to a tire rim which has a bore extending therethrough from the outer surface thereof to the inner surface and which comprises a tubular valve body with an outer rim surface engagement flange formed on the surface thereof spaced axially away from an inner rim surface engagement flange which is also formed on the outer surface of the body and wherein at least one outer and inner flange comprises a deformed tubular portion bent over the associated rim surface, the resulting flanges being spaced apart by the length of the bore through the rim.

Another object of the invention is to provide a valve for a tubeless tire which includes either an outer or an inner surface which forms a flange engageable over an end of a resilient tubular member and the associated surface of the tire rim and an opposite flange which is deformable over the other end of the resilient body which also engages over the other surface of the rim.

A further object of the invention is to provide a valve for a tubeless tire which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

BRIEF DESCRIPTION OF THE DRAWING

In the drawing:

FIG. 1 is an axial sectional view of a valve for a tubeless tire, constructed in accordance with the invention, and indicating on one half of the bottom of the drawing, the construction in a final fixed form, and the other half showing the initial construction;

FIG. 2 is a partial elevational view of the valve body and sectional view of the tire rim indicating the insertion of the valve body into the rim; and FIGS. 3 and 4 and 5 and 6 are views corresponding to FIG. 1 and FIG. 2, but showing different embodiments of the invention.

DESCRIPTION OF THE PREFERRED EMBODIMENTS

Referring to the drawing in particular, the invention embodied therein, comprises a valve for a tubeless tire which is to be secured to a tire rim 3 which has a bore 2 extending from an outer surface 7 to an inner or interior surface 15.

A valve 50, shown in FIGS. 1 and 2, includes a valve body 11 which is inserted into the bore 2 of a wheel-rim or tire 3 in the direction of arrow 1. According to FIG. 1, its lower end is designed as a sleeve 4 which is surrounded by soft lining 5, which is also sleeve-shaped. An outer flange 6 is provided at the upper end of sleeve 4, which, in assembled state, rests against the outer surface 7 of wheel-rim 3. In the transition zone between sleeve 4 and outer flange 6, an annular groove 8 is provided in outer flange 6. The groove is completely filled by an outer flange 9 of the soft lining 5.

Soft lining 5 projects from bore 2 of the tire rim 3 downwardly by some millimeters. In turn, sleeve 4 projects beyond soft lining 5 by about the same length. With the aid of a suitable tool (not shown), the free end of sleeve 4, i.e., in FIG. 1, the lower end of valve body 11, is bent outwardly. Thereby, the projecting border of the valve body takes, for example, an arcuate shape. At the same time, the projecting rim of soft lining 5 is also bent and this portion fills up a formed circular groove 12 of the valve body 11 completely.

During this riveting or beading operation, the material of the soft lining is compressed in an amount depending on the chosen tolerances. Thereby, the lining takes up all the inequalities both of the tire rim bore 2 and of the surrounding portions of valve body 11. In this way, not only is a satisfactory fixing of the valve to the tire rim obtained, but an airtight conneton between the tire rim and valve is also effected. The valve core or valve element 13, shown in FIG. 1, is of a well-known design, which requires no explanation.

In the embodiment of FIGS. 3 and 4, valve 52 is introduced into the tire rim bore 2 from the opposite side. The direction is indicated at 14. Consequently, outer flange 6' is now provided on the lower end of valve body 11'. This flange 6' rests against an inside surface 15 of the wheel rim and is also formed with an annular groove 8'. As in the embodiment of FIG. 1, the groove 8' is completely filled up by an outer flange 9' of soft lining 5'.

While in the first embodiment, the fixing rim 16 points in the direction of the inlet end 17 of the valve and is formed by the free end 10 of valve body 11, in the embodiment of FIG. 3, a fixing rim 16' and inlet 17 are oriented in the same direction. Fixing rim 16' comprises a sleeve 19 which concentrically surrounds valve body 11' in the zone 18 thereof associated with tire rim 3 and which has an outer diameter corresponding to the inner diameter of soft lining 5' and the shape of a circular cylinder. Inside, sleeve 19 is tapered toward its free end. Analogously to the embodiment of FIG. 1, fixing rim 16 is bent outwardly. During this operation, the soft lining is again embraced and compressed by the free rim of the sleeve. The left portions of FIGS. 1, 3 and 5 show the fixing rim or collar of the valve after insertion into the wheel rim but prior to its deformation, while the right portions show the fixed, final, state of the valve.

As already mentioned, the valve may be equipped with a standard valve core 13 or with a very simply designed special valve core 20. Preferably, the inlet end of the valve or valve body 11' is provided with a universally standardized outer thread 21 for screwing on a dust cap.

In the embodiment of FIGS. 5 and 6, a valve 54 has an inner shoulder 23 projecting into the bore 22 of valve body 11" instead of a sleeve-shaped fixing rim.

Upon introduction of the valve 54 in the direction of arrow 24, bore 22 is expanded, for example, by means of a tool driven in the direction of arrow 25. This makes shoulder 23 yield laterally and an outer collar 26 is formed, as shown in the righthand portion of FIG. 5. Collar 26 engages the outside surface 7" of wheel rim 3" and provides the necessary hold for the valve of the wheel rim. At the same time, the desired sealing is obtained and a projecting rim 27 of soft lining 56 is pressed against outside surface 7" and is embraced by collar 26.

The soft lining 56 is preferably made of polytetrafluoroethylene, but rubber or another plastic may also be used instead. If the valve body of a suitable material, preferably plastic having cold flow properties is provided, the soft lining 56 may be omitted.

The statement in the foregoing that the outer diameter of fixing rim 16" or shank portion 4" preferably corresponds to the inner diameter of soft lining 5" applies to the non-assembled state of the valve. After the fixing operation, i.e., upon bending the fixing rim, the outer diameter of the latter becomes larger, of course.

While specific embodiments of the invention have been shown and described in detail to illustrate the application of the principles of the invention, it will be understood that the invention may be embodied otherwise without departing from such principles.

What is claimed is:

1. A valve for the bore in a tire rim of a tubeless tire comprising:
   a tubular metal valve body having a passage communicating with the interior of the tubeless tire;
   a valve core movable in the passage to block a flow of air therethrough out of the interior of the tubeless tire;
   said valve body having, a rim surface engagement flange extending radially outwardly of the rim bore and bearing on one side of the rim adjacent the rim bore for fixing said valve body in one direction in the rim bore, a deformable tubular portion permanently deformed from an axial position to a radially outwardly extending position and bearing on an opposite side of the rim adjacent the bore to fix the valve body in an opposite direction, and a sleeve extending through the bore and connecting said deformed tubular portion and said engagement flange, the spacing between said flange and said deformed tubular portion being approximately equal to the length of the rim bore;
   said deformed tubular portion comprising an initially annular tubular portion extending axially with a remainder of said valve body which is deformed downwardly against an outer surface of the rim adjacent the rim bore; and
   a soft material lining the outer diameter of which is initially approximately equal in diameter to the diameter of the rim bore, disposed and compressed between the rim bore and said valve body sleeve for establishing an air-tight seal between said valve body and the rim, ends of said soft material lining at opposite ends of the rim bore being bent over by said flange and said deformed tubular portion and pressed into engagement with the one and the opposite side of the rim adjacent the rim bore.

2. A valve for a tubeless tire, according to claim 1, wherein said deformed tubular portion includes an inwardly formed portion of said valve body, said inwardly formed portion being deformed outwardly over the associated surface of said tire rim.

3. A valve for a tubeless tire, according to claim 1, wherein said soft material lining comprises a rubber or plastic material, particularly polytetrafluoroethylene.

4. A valve for a tubeless tire, according to claim 1, wherein said deformed tubular portion comprises a lower end of said valve body bearing against an inner surface of the rim adjacent the rim bore.

5. A valve for a tubeless tire, according to claim 1, wherein said deformed tubular portion comprises an intermediate part of said valve body bearing against an outer surface of the rim adjacent the rim bore.

* * * * *